United States Patent Office
3,761,402
Patented Sept. 25, 1973

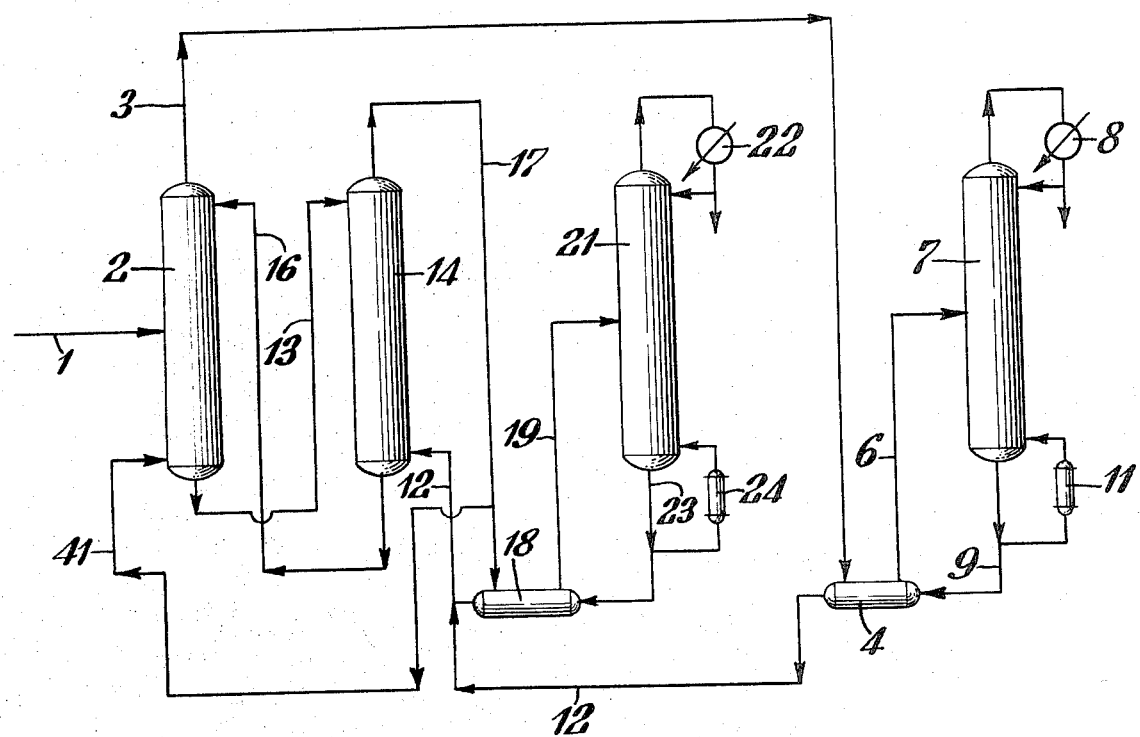

3,761,402
PROCESS FOR THE SEPARATION OF AROMATIC HYDROCARBONS FROM A MIXED HYDROCARBON FEEDSTOCK
Gilbert R. Atwood, Briarcliff Manor, N.Y., assignor to Union Carbide Corporation, New York, N.Y.
Filed May 26, 1971, Ser. No. 146,952
Int. Cl. C07c 7/10; C10g 21/02
U.S. Cl. 208—314
3 Claims

ABSTRACT OF THE DISCLOSURE

Aromatic hydrocarbons are separated from a mixture containing the same together with nonaromatic hydrocarbons. The mixture is first contacted with a solvent which selectively dissolves the aromatic fraction and the extract from this step which contains the aromatic hydrocarbon dissolved in the solvent is subjected to a secondary extraction step using a solvent which has a higher boiling point than and is non-azeotropic with the original feed mixtures. Thereafter the aromatic hydrocarbons are recovered by a series of distillation steps. A portion of the extract recovered from the secondary extraction step is branched off before being distilled and is recycled to the first solvent extraction step as a reflux stream.

FIELD OF THE INVENTION

This invention relates to an improvement in a process for the separation of aromatic hydrocarbons from a mixed hydrocarbon feedstock and, more particularly, to the recovery of aromatic hydrocarbons using minimal distillation requirements.

DESCRIPTION OF THE PRIOR ART

U.S. Pat. No. 3,492,365 issued on Jan. 27, 1970 to John R. Anderson and George S. Somekh, which is incorporated by reference herein, describes a process for the separation of aromatic hydrocarbons utilizing two extraction steps to provide an extract comprising the aromatic hydrocarbons from the original mixed feed dissolved in a so-called secondary solvent, the extraction medium in the second step. This solution or secondary extract is then subjected to distillation to separate the aromatic hydrocarbons from the solvent, the aromatic being subjected to further distillation to recover specific aromatics and the extraction solvents being recycled.

With the advent of the benzene-toluene-$C_8$ aromatics fraction (known and hereinafter referred to as BTX) as the principal raw material in the manufacture of petrochemicals, outstripping ethylene in this regard, and the increased demand for aromatics as a component in gasoline to increase its octane rating and thus reduce or eliminate the need for lead, which has been under fire as a pollutant, aromatics processes availed of in the past have come under close scrutiny with an eye toward improving process economics. Improved process economics can be translated into, among other things, the use of less apparatus; decreasing heat requirements; and the effective use of process components as aids in the separation process.

Methods, other than that of U.S. 3,492,365 described above, have also been used for aromatics separations, e.g., (1) a process using an extraction column which sends a glycol solvent/water solution, BTX and reflux to a two step distillation column. The resulting BTX is then redistilled to remove water and entrained glycol; (2) a similar process using two distillation columns, BTX and water being distilled in the second column; (3) another similar process using two distillation columns, in the second column of which BTX and glycol are distilled. All of these processes, while viable commercially, have not succeeded in optimizing distillation economics.

SUMMARY OF THE INVENTION

An object of this invention, therefore, is to provide an improvement in the process of U.S. 3,492,365 for the separation of aromatic hydrocarbons from a mixed hydrocarbon feedstock whereby aromatics can be recovered with reduced heating requirements and less apparatus.

Other objects and advantages will become apparent hereinafter.

According to the present invention, aromatic hydrocarbons are effectively separated from mixed hydrocarbon feedstocks and specific aromatic components recovered with minimal distillation requirements by a continuous process comprising the following steps:

(a) Contacting the feedstock with a primary solvent and a secondary solvent in a primary extraction zone at a temperature in the range of about 50° C. to about 150° C. and a pressure in the range of about atmospheric pressure to about 200 p.s.i.a. wherein the primary solvent is a water-soluble organic solvent, which has a higher boiling point than and is non-azeotropic with the feedstock, and the secondary solvent is selected from the group consisting of paraffinic and naphthenic hydrocarbons and mixtures thereof, said hydrocarbons having higher boiling points than and being non-azeotropic with the feedstock, and wherein the primary solvent is maintained in sufficient amount to extract essentially all of the aromatic hydracarbons from the feedstock and the secondary solvent is maintained in sufficient amount to act as a reflux for the feedstock;

(b) Withdrawing from the primary extraction zone primary extract comprising aromatic hydrocarbons and primary solvent and raffinate comprising aliphatic hydrocarbons and secondary solvent;

(c) Contacting said primary extract with secondary solvent in a secondary extraction zone wherein the temperature and pressure are in the same range as in step (a) and the seconary solvent is maintained in sufficient amount to extract essentially all of the aromatic hydrocarbons from the primary extract;

(d) Withdrawing from the secondary extraction zone primary solvent and secondary extract comprising aromatic hydrocarbons and secondary solvent;

(e) Subjecting the raffinate to distillation in a raffinate distillation zone whereby the aliphatic hydrocarbons are separated from the secondary solvent;

(f) Withdrawing the secondary solvent from the raffinate distillation zone and recycling said secondary solvent to the secondary extraction zone;

(g) Recycling the primary solvent withdrawn from the secondary extraction zone to the primary extraction zone;

(h) Recycling a sufficient amount of secondary extract to the primary extraction zone to provide the secondary solvent required in step (a);

(i) subjecting the remaining secondary extract to distillation to separate the aromatic hydrocarbons from the secondary solvent; and (j) Recycling the secondary solvent from step (i) to the secondary extraction zone.

BRIEF DESCRIPTION OF THE DRAWING

The sole figure is a schematic flow diagram of an illustrative embodiment of the present invention.

DESCRIPTION OF THE PREFERRED EMBODIMENT

As noted above, there is an industrial need for BTX, which is available in high proportion, e.g., greater than 30 percent by weight, in a wide variety of hydrocarbon feedstocks such as reformed gasolines; coke oven light oils; cracked gasolines; and dripolenes, which, after hydrogenation, can contain as much as 70 to 98 percent BTX. These feedstocks also contain both aliphatic and cycloaliphatic hydrocarbons. Since the individual hydrocarbon compounds which make up these feedstocks are well known, they will not be discussed extensively; however, it can be pointed out that the major components of the feedstocks are hydrocarbons with boiling points ranging from 60° C. to 200° C. including straight-chain and branched-chain paraffins and naphtenes, such as n-heptane, isooctane, and methyl cyclohexane, and aromatics such as BTX.

The BTX fraction can include benzene, toluene, the $C_8$ aromatics including ortho-xylene, meta-xylene, para-xylene, and ethyl benzene, and $C_9$ aromatics, which, if present at all, appear in the smallest proportion in relation to the other components.

The primary solvent is defined above as a water-soluble organic solvent, which has a higher boiling point than and is non-azeotropic with the feedstock. It is also polar. Examples of solvents which may be used in the process of this invention as primary solvents are dipropylene glycol, tripropylene glycol, dibutylene glycol, tributylene glycol, ethylene glycol, diethylene glycol, propylene glycol, butylene glycol, ethylene glycol monomethyl ether, ethylene glycol monoethyl ether, diethylene glycol monomethyl ether, diethylene glycol monoethyl ether, sulfolane, N-methyl pyrrolidone, triethylene glycol, tetraethylene glycol, ethylene glycol diethyl ether, propylene glycol monoethyl ether, pentaethylene glycol, hexaethylene glycol, and mixtures thereof. The preferred groups of solvents are polyalkylene glycols and the preferred solvent is tetraethylene glycol. It should be noted that the feedstock and primary solvent must be selected so that the definition of the primary solvent, set forth above, is satisfied, i.e., with respect to boiling point and azeotropic characteristics.

The secondary solvent is defined above as a solvent selected from the group consisting of paraffinic and napthenic hydrocarbons and mixtures thereof, said hydrocarbons having higher boiling points than and being non-azeotropic with the feedstock. A for the primary solvent, both the feedstock and secondary solvent must be selected so that the definition of the secondary solvent is satisfied. Examples of secondary solvents which may be used alone or together are n-decane, n-dodecane, 2-methyl decane, 2,2-dimethyl decane, n-hexyl cyclohexane, 2-methyl hexyl cyclohexane, tridecane, n-tetradecane, n-pentadecane, n-hexadecane, n-heptadecane, n-octadecane and n-nonadecane. Generally, a mixture in the form of a fraction wherein the components boil within a particular range is used.

The apparatus used in the process both for extraction and distillation is conventional, e.g., an extraction column of the multistage reciprocating type containing a plurality of perforated plates centrally mounted on a vertical shaft driven by a motor in an oscillatory manner can be used as well as columns containing pumps with settling zones, sieve trays with upcomers, or even a hollow tube while the distillation can be conducted in a packed or bubble plate fractionating column. Counter-current flows are utilized in both extraction and distillation columns.

Referring to the drawing:

The feedstock is introduced through line 1 at about the middle tray of primary extractor 2; primary solvent, essentially free of water (trace amounts may be present), is introduced at the top tray of primary extractor 2; and secondary solvent is introduced below the bottom tray of primary extractor 2. The function of the secondary solvent in the primary extractor is to act as a reflux, i.e., to purify the aromatics present in the feedstock.

As stated above, the primary solvent is introduced into and maintained in the primary extractor in sufficient amount to extract essentially all of the aromatic hydrocarbons from the feedstock and the secondary solvent is introduced into and maintained therein in sufficient amount to act as a reflux for the feedstock. Generally, to accomplish the extraction the ratio of primary solvent to feedstock in the primary extractor is in the range of about 6 to about 16 parts by weight of primary solvent to one part by weight of feedstock. This board range can be expanded upon where nonpreferred solvents are used. A board range of about 8 to about 14 parts by weight of primary solvent to one part by weight of feedstock and a preferred range of about 9 parts to about 11 parts of primary solvents per part of feedstock can be used successfully for the solvent of preference and other like solvents. In final analysis, however, the ratio is selected by the technician based on experience with the particular feedstock and depends in part upon whether high recovery or high purity is being emphasized. The the same is true of the secondary solvent, the suggested ratio of primary solvent to secondary solvent in the primary extractor being in the range of about 0.5 parts to about 20 parts by weight of primary solvent to one part by weight of secondary solvent and, preferably, about 5 parts to about 15 parts by weight of primary solvent per part of secondary solvent.

The temperature in the primary extractor is in the range of about 50° C. to about 150° C. and is preferably in the range of about 80° C. to about 110° C., especially of the solvent of preference.

The pressure in the primary extractor is in the range of about atmospheric pressure to about 200 pounds per square inch absolute (p.s.i.a.). As is well known in the art, however, one selected pressure is not maintained throughout the extraction zone, but, rather, a high pressure within the stated range is present at the bottom of the zone and a low pressure again within the stated range is present at the top of the zone with an intermediate pressure in the middle of the zone. The pressures in the zone depend on the design of the equipment and the temperature, both of which are adjusted to maintain the pressure within the stated range, which is important if the preferred mode of taking a liquid overhead in the extraction zones is to be achieved.

The raffinate is such a liquid taken overhead. It includes the feed aliphatics, essentially all of the reflux secondary solvent, some entrained primary solvent, and may contain some $C_9$ aromatics in very small proportion. The raffinate leaves the primary extractor via overhead line 3 and passes to heat exchanger 4 where it is heated to about its boiling point and may be partially vaporized if desired thus reducing the heating requirements in the raffinate stripper. In this heated state, the raffinate then passes into raffinate stripper 7 via line 6 where the bulk of the aliphatics along with some $C_9$ aromatics, if any, are removed as a vapor overhead and pass through condenser 8. A portion of the condensate is returned to the top tray of raffinate stripper 7 as a reflux which aids in purifying the raffinate by knocking down the high boilers. The secondary solvent (including entrained primary solvent and which may include other high boiling aliphatics from the feed) is removed as bottoms and passes through line 9 where part is diverted through reboiler 11 and returns to to raffinate stripper 7 below the bottom tray as a vapor to provide most of the heating requirement. The balance of the secondary solvent proceeds via line 9 to heat exchanger 4 where it is cooled to the extraction temperature.

The secondary solvent continues via line 12 to a point below the bottom tray of the secondary extractor.

The primary extract, which includes the feed aromatics, the bulk of the primary solvent, a small amount of secondary solvent entrained in the primary solvent, and possibly some high boiling aliphatics, passes as bottoms from primary extractor 2 through line 13 to the top of secondary extractor 14.

Initially, secondary solvent is fed into secondary extractor 14 at the bottom from a reservoir to provide secondary solvent in sufficient amount to extract essentially all of the aromatic hydrocarbons from the primary extract. Generally, the ratio of secondary solvent to primary solvent is in the range of about 0.1 part to about 5 parts by weight of secondary solvent per part by weight of primary solvent and, preferably, about 0.3 part to about 0.7 part by weight of secondary solvent for each part by weight of primary solvent. These ratios are especially relevant for the solvent of preference or like solvents; however, although such ratios may be used for other solvents, it is suggested that the technician select ratios based on experience with particular feedstocks as mentioned for the other ratios above. The same reservoir is used to provide make-up secondary solvent to maintain the described ratio in the secondary extractor. After the cycle has started up, however, the bulk of the secondary solvent is that which is recycled from the distillation zone.

The temperature and pressure in the secondary extractor is kept within the same range as that described above for the primary extractor.

The primary solvent essentially free of aromatics, with the small amount of dissolved and entrained secondary solvent becomes the bottoms of the secondary extractor and returns to the top of the primary extractor via line 16. The primary solvent thus avoids high distillation temperatures which lead to its degradation.

The feed aromatics extracted from the primary extract together with the bulk of the secondary solvent (including about one and a half percent dissolved and entrained primary solvent) make up the secondary extract, which passes as a liquid overhead via line 17. A portion of the secondary extract is diverted from line 17 through line 41 and returned to primary extractor 2 to provide the reflux requirement, i.e., the amount of secondary extract returned to the primary extractor is sufficient to provide the secondary solvent required to act as a reflux for the feedstock as discussed above. The balance of the secondary extract continues via line 17 to heat exchanger 18 where it is heated to its boiling point and may be partially vaporized and then passes into the middle of secondary extract stripper 21 through line 19. Vapor is carried overhead in stripper 21 and passes into condenser 22.

The temperature at the top of stripper 21 is at the boiling point of the mixture of aromatics present in the stripper while the temperature at the bottom of he stripper is, generally, the boiling point of the secondary solvent.

Atmospheric pressure is generally used in the distillation columns, but other pressures, both superatmospheric and subatmospheric, can also be used.

A portion of the condensate is returned to the top tray of stripper 21 as a reflux. The ratio of the amount of product returned as reflux to the amount of product recovered from the distillation column is known as the reflux ratio of the distillation column. It is advantageous to have a low reflux ratio since less heat is then needed to vaporize the product in the column. It is found that the recycling of secondary extract from the secondary extractor to the primary extractor has the ultimate effect of lowering the reflux ratio in stripper 21. It is further found that running this embodiment without recycling the secondary extract increases the reflux ratio by as much as 100 percent (on a weight basis). Finally the high aromatics content of the extract in the distillation zone (which is a result of recycling) reduces the secondary solvent per unit of aromatics and, therefore, makes possible a reduction of distillation column height and diameter. The reflux ratio in stripper 21, generally is in the range of 0.3 to 0.9 in the instant process, but varies according to the amount of aromatics in the feed, e.g., the lower the aromatics content of the feed the higher the ratio.

The secondary solvent, which still includes some dissolved and entrained primary solvent, passes as bottoms from stripper 21 via line 23 where a portion of it is directed into reboiler 24 and returns as a vapor to a point below the bottom tray of stripper 21 to provide most of its heating requirement while the balance of the secondary solvent passes through heat exchanger 18 where it is cooled to the extraction temperature and continues to join line 12 until it reenters the bottom of secondary extractor 14. As stated above, make-up secondary solvent is introduced at this point, if needed, to maintain the proper ratio.

The following examples illustrate the invention:

Example 1

The process is carried out in a continuous manner using the system illustrated in the drawing and as heretofore described.

Tetraethylene glycol is employed as the primary solvent and an aliphatic fraction boiling in the range of 204° C. to 257° C. and containing dodecane is employed as the secondary solvent.

The feedstock has the following composition:

| Component: | Percent by volume at 25° C. |
|---|---|
| Benzene | 20 |
| Toluene | 25 |
| $C_8$ aromatics | 30 |
| $C_9$ aromatics | 5 |
| Aliphatics | 20 |
| | 100 |

The drums containing primary solvent and secondary solvent are maintained at about 110° C. so that the solvents will enter the extraction columns at about 100° C. The primary solvent, feedstock, and secondary solvent are fed into the primary extractor at the first stage, tenth stage, and below the twenty-eighth stage, respectively.

The primary extractor is a twenty-eight stage mixer-settler thermostated at 100° C.

The primary extract then passes to the first stage at the top of the secondary extractor where it enters at a temperature of about 100° C. This secondary extractor is identical to the primary extractor in all respects except that it has only eighteen stages. The secondary solvent also enters the secondary extractor at about 100° C. at a point below the eighteenth stage.

The primary raffinate passes to the raffinate stripper, which is made of glass and has a section packed with stainless steel packing, and has the equivalent of about ten theoretical stages.

The aromatics-laden secondary solvent is withdrawn from the first stage of the secondary extractor, a portion is diverted and sent to the primary extractor, and the balance is sent to the aromatics stripper, which is made of glass, has a section packed with extruded stainless steel packing, and has the equivalent of about ten theoretical stages.

Atmospheric pressure is maintained in each of the columns and a maximum operating temperature of 110° C. is maintained in the extractors and of 225° C. in the distillation columns.

The ratio of primary solvent to feedstock in the primary extractor is maintained at 10:1 (by weight); the ratio of primary solvent to secondary solvent in the primary extractor is maintained at 10:1 (by weight); and the ratio of secondary solvent to primary solvent in the secondary extractor is maintained at 0.48:1 (by weight).

The aromatics concentration in the primary extract is found to be 8.94 percent by weight; the aromatics concentration in the secondary extract is 16.80 percent by weight; and the relative mass of the distillation stream is 4.60 per unit of initial feed.

The results appear in the table below.

The aromatics concentration and the mass of the distillation stream are determinative of the reflux ratio and the distillation heating requirement. Where the aromatics concentration in the secondary extract is increased and the mass of the distillation stream is decreased, both the reflux ratio and the distillation heating requirement can be decreased as well as the height and diameter of the distillation column.

Example 2

This example is a comparative example and a repeat of Example 1 except that secondary extract is not recycled to the primary extractor; however, secondary solvent from the raffinate stripper is recycled to the primary extractor.

In this example, the aromatics concentration in the primary extract is reduced to 7.23 percent by weight; the aromatics concentration in the secondary extract is reduced to 14.01 percent by weight; and the relative mass for the distillation stream is increased to 5.21 per unit of initial feed. It is, therefore, necessary to increase the reflux ratio and the heating requirement in the distillation zone in this example from that of Example 1 to carry out the required distillation.

The results appear in the table below.

TABLE

| Example | Reflux ratio in distillation zones, e.g., stripper 21 [1] | Recovery of aromatics (percent by weight based on aromatics in distillation feed) [2] | Recovery of xylene (percent by weight based on xylene in distillation feed) [2,3] |
|---|---|---|---|
| 1 | 0.6 | 99.45 | 99.950 |
| 1 | 1.2 | 99.47 | 99.985 |
| 2 | 0.6 | <98.00 | <99.900 |
| 2 | 0.9 | 98.97 | 99.930 |
| 2 | 1.2 | 99.05 | 99.950 |
| 2 | 1.8 | 99.28 | 99.970 |

[1] In each example, reflux ratio was changed. The ratios set forth represent different cycles run in the process of the example mentioned therefor.
[2] High purity is achieved in all examples.
[3] Distillation of xylene is conducted in a stripper similar to stripper 21.

What is claimed is:

1. A continuous process for separating aromatic hydrocarbons from mixed hydrocarbon feedstock containing aliphatic and aromatic hydrocarbons consisting essentially of the following steps:

(a) contacting the feedstock with a primary solvent and a secondary solvent in a primary extraction zone at a temperature in the range of about 50° C. to about 150° C. and a pressure in the range of about 14 p.s.i.a. to about 200 p.s.i.a. wherein the primary solvent is a water-soluble organic solvent, which has a higher boiling point than and is non-azeotropic with the feedstock and the secondary solvent comprises a solvent selected from the group consisting of paraffinic and naphthenic hydrocarbons and mixtures thereof, said hydrocarbons having higher boiling points than and being non-azeotropic with the feedstock, and wherein the primary solvent is maintained in sufficient amount to extract essentially all of the aromatic hydrocarbons from the feedstock and the secondary solvent is maintained in sufficient amount to act as a reflux for the feedstock;

(b) withdrawing from the primary extraction zone primary extract comprising aromatic hydrocarbons and primary solvent and raffinate comprising aliphatic hydrocarbons and secondary solvent;

(c) contacting said primary extract with secondary solvent in a secondary extraction zone wherein the temperature and pressure are in the same range as in step (a) and the secondary solvent is maintained in sufficient amount to extract essentially all of the aromatic hydrocarbons from the primary extract;

(d) withdrawing from the secondary extraction zone primary solvent and secondary extract comprising aromatic hydrocarbons and secondary solvent;

(e) subjecting the raffinate to distillation in a raffinate distillation zone whereby the aliphatic hydrocarbons are separated from the secondary solvent;

(f) withdrawing the secondary solvent from the raffinate distillation zone and recycling said secondary solvent to the secondary extraction zone;

(g) recycling the primary solvent wthdrawn from the secondary extraction zone to the primary extraction zone;

(h) recycling a sufficient amount of secondary extract to the primary extraction zone to provide the secondary solvent required in step (a);

(i) subjecting the remaining secondary extract to distillation to separate the aromatic hydrocarbons from the secondary solvent; and (j) recycling the secondary solvent from step (i) to the secondary extraction zone.

2. The process of claim 1 wherein the temperature in the extraction zones is in the range of about 80° C. to about 110° C.

3. The process of claim 2 wherein the ratio of primary solvent to feedstock in the primary extractor is maintained in the range of about 6 parts to about 16 parts by weight of primary solvent to one part by weight of feedstock; the ratio of primary solvent to secondary solvent in the primary extractor is maintained in the range of about 0.5 part to about 20 parts by weight of primary solvent to one part by weight of secondary solvent; and the ratio of secondary solvent to primary solvent in the secondary extractor is maintained in the range of about 0.1 to about 5 parts by weight of secondary solvent to one part by weight of primary solvent.

References Cited

UNITED STATES PATENTS 3,492,365 1/1970 Anderson et al. _____ 260—674
2,727,848 12/1955 Georgian _____ 208—321

DELBERT E. GANTZ, Primary Examiner

C. E. SPRESSER, Jr., Assistant Examiner

U.S. Cl. X.R.

208—317; 260—674 SE